US012548066B2

(12) United States Patent
Zhao et al.

(10) Patent No.: US 12,548,066 B2
(45) Date of Patent: Feb. 10, 2026

(54) SYSTEMS AND METHODS FOR PRODUCT RETRIEVAL

(71) Applicant: ADOBE INC., San Jose, CA (US)

(72) Inventors: Handong Zhao, Cupertino, CA (US); Haoyu Ma, Irvine, CA (US); Zhe Lin, Clyde Hill, WA (US); Ajinkya Gorakhnath Kale, San Jose, CA (US); Tong Yu, Cupertino, CA (US); Jiuxiang Gu, Baltimore, MD (US); Sunav Choudhary, West Bengal (IN); Venkata Naveen Kumar Yadav Marri, Fremont, CA (US)

(73) Assignee: ADOBE INC., San Jose, CA (US)

( * ) Notice: Subject to any disclaimer, the term of this patent is extended or adjusted under 35 U.S.C. 154(b) by 938 days.

(21) Appl. No.: 17/664,079

(22) Filed: May 19, 2022

(65) Prior Publication Data

US 2023/0376828 A1 Nov. 23, 2023

(51) Int. Cl.
*G06Q 30/0601* (2023.01)
*G06F 16/9538* (2019.01)
*G06N 20/00* (2019.01)

(52) U.S. Cl.
CPC ..... *G06Q 30/0641* (2013.01); *G06F 16/9538* (2019.01); *G06N 20/00* (2019.01)

(58) Field of Classification Search
CPC ............ G06Q 30/0641; G06F 16/9538; G06F 16/9532; G06N 20/00; G06N 3/045; G06N 3/088
See application file for complete search history.

(56) References Cited

U.S. PATENT DOCUMENTS

| | | | | |
|---|---|---|---|---|
| 12,038,970 B2* | 7/2024 | Li | ........................ | G06F 16/538 |
| 2016/0225056 A1* | 8/2016 | Pellow | .............. | G06Q 30/0643 |
| 2022/0114349 A1* | 4/2022 | Sollami | ................... | G06F 16/35 |
| 2022/0300804 A1* | 9/2022 | Guan | ..................... | G06N 3/084 |
| 2023/0177581 A1* | 6/2023 | Ren | ..................... | G06Q 30/0282 |
| | | | | 705/26.7 |
| 2023/0252550 A1* | 8/2023 | Baltescu | ............. | G06F 16/9024 |
| | | | | 705/26.7 |
| 2025/0147958 A1* | 5/2025 | Na | ...................... | G06F 16/2448 |

OTHER PUBLICATIONS

1 Devlin, et al., "BERT: Pre-training of Deep Bidirectional Transformers for Language Understanding", arXiv preprint arXiv:1810.04805v2 [cs.CL] May 24, 2019, 16 pages.

(Continued)

*Primary Examiner* — Jared M Bibbee

(74) *Attorney, Agent, or Firm* — F. CHAU & ASSOCIATES, LLC

(57) ABSTRACT

Systems and methods for product retrieval are described. One or more aspects of the systems and methods include receiving a query that includes a text description of a product associated with a brand; identifying the product based on the query by comparing the text description to a product embedding of the product, wherein the product embedding is based on a brand embedding of the brand; and displaying product information for the product in response to the query, wherein the product information includes the brand.

14 Claims, 12 Drawing Sheets

(56) References Cited

OTHER PUBLICATIONS

2Dodds, et al., "Modality-Agnostic Attention Fusion for visual search with text feedback", arXiv preprint arXiv:2007.00145v1 [cs.CV] Jun. 30, 2020, 14 pages.
3Gao, et al., "FashionBERT: Text and Image Matching with Adaptive Loss for Cross-modal Retrieval", arXiv preprint arXiv:2005.09801v2 [cs.IR] May 29, 2020, 10 pages.
4Girshick, "Fast R-CNN", arXiv preprint arXiv:1504.08083v2 [cs.CV] Sep. 27, 2015, 9 pages.
5He, et al., "Ups and Downs: Modeling the Visual Evolution of Fashion Trends with One-Class Collaborative Filtering", arXiv preprint arXiv:1602.01585v1 [cs.AI] Feb. 4, 2016, 11 pages.
6Jia, et al., "Scaling Up Visual and Vision-Language Representation Learning with Noisy Text Supervision", arXiv preprint arXiv:2102.05918v2 [cs.CV] Jun. 11, 2021, 14 pages.
7Krichene, et al., "On Sampled Metrics for Item Recommendation", In KDD '20: Proceedings of the 26th ACM SIGKDD International Conference on Knowledge Discovery & Data Mining, Aug. 23, 2020, p. 1748-1757, 10 pages.
8Mikolov, et al., "Efficient Estimation of Word Representations in Vector Space", arXiv preprint arXiv:1301.3781v3 [cs.CL] Sep. 7, 2013, 12 pages.
9Pearl, "Causality: Models, Reasoning, and Inference", Cambridge University Press, Cambridge, UK, 2009.
10Radford, et al., "Learning Transferable Visual Models from Natural Language Supervision", arXiv preprint arXiv:2103.00020v1 [cs.CV] Feb. 26, 2021, 48 pages.
11Rostamzadeh, et al., "Fashion-Gen: The Generative Fashion Dataset and Challenge", arXiv preprint arXiv:1806.08317v2 [stat.ML] Jul. 30, 2018, 10 pages.
12Wang, et al., "Visual Commonsense R-CNN", arXiv preprint arXiv:2002.12204v3 [cs.CV] Apr. 27, 2020, 20 pages.
13Wang, et al., "Visual Commonsense Representation Learning via Causal Inference", In 2020 IEEE/CVF Conference on Computer Vision and Pattern Recognition, CVPR Workshops 2020, Jun. 14, 2020, pp. 1547-1550, 4 pages.
14Zhang, et al., "Mode-Adaptive Neural Networks for Quadruped Motion Control", In ACM Transactions on Graphics (TOG), vol. 37, No. 4, Aug. 2018, p. 1-11, 11 pages.
15Zhang, et al., "DeVLBert: Learning Deconfounded Visio-Linguistic Representations", arXiv preprint arXiv:2008.06884v2 [cs.CV] Oct. 2, 2020, 10 pages.
16Zhuge, et al., "Kaleido-BERT: Vision-Language Pre-training on Fashion Domain", arXiv preprint arXiv:2103.16110v3 [cs.CV] Apr. 15, 2021, 11 pages.

\* cited by examiner

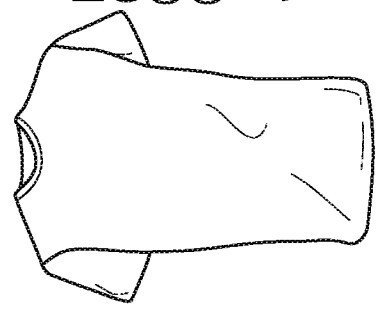

Gas Station

"Gasoline" "Fuel"
"Garage" "Gas"
"Pump" "Vehicle"
"Gas Station" "Petrol"

Crew Neck T-Shirt

Brand: Gasoline
Category: T-Shirt
Composition [shell]: Cotton
Composition [lining]: Nylon
Fit: Relaxed
Washing Instruction:
Machine Wash California Goose Big Bird in Flight Close Beautiful Water Lake

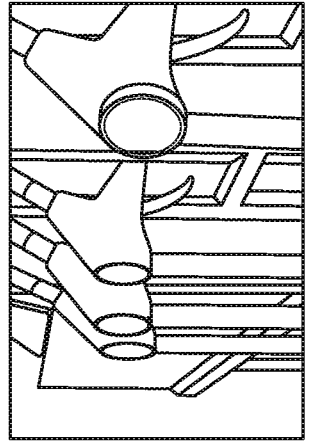

"Goose" "California"
"Wing" "Flying"
"Water" "Lake"
"Wildlife" "Bird"
"Nature" "Bird"

California Goose Men's Expedition Parka Coat

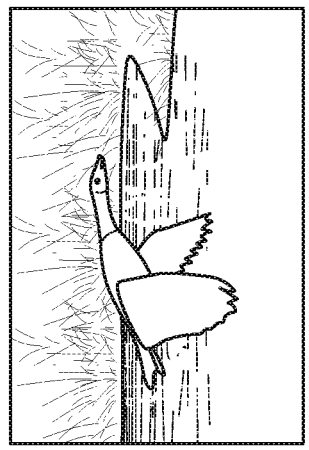

Brand: California Goose
Category: Outwear
Composition [shell]: Nylon
Composition [lining]: Nylon
Fit: Relaxed
Washing Instruction:
Machine Wash

FIG. 11

SYSTEMS AND METHODS FOR PRODUCT RETRIEVAL

BACKGROUND

The following relates generally to cross-modal retrieval, and more specifically to product retrieval. Cross-modal retrieval refers to a machine learning technique of retrieving an image in response to a text query, or text in response to an image query. In cross-modal retrieval, text and images can be represented as vectors in a same feature space, such that text can be matched with an image by determining a probability that an associated text vector and image vector match by computing a distance between the two vectors.

Conventional cross-modal retrieval techniques can be applied to general retrieval tasks, or to more specialized retrieval tasks, such as product retrieval. Product retrieval refers to retrieving product information in response to a query. However, conventional product retrieval techniques may include biases that negatively impact their ability to return product information that matches the query. There is therefore a need in the art for product retrieval systems and methods that are able to return product information that more accurately matches a query.

SUMMARY

Embodiments of the present disclosure provide systems and methods for product retrieval that use a machine learning model to return accurate product information in response to a user query that includes a description of a product associated with the brand. By computing a product embedding based on a brand embedding and comparing the product embedding with an embedding of the description, and returning a product description based on the comparison, embodiments of the present disclosure avoid a bias in the query response that may be present in conventional product retrieval techniques due to the embedding of misleading metadata associated with the product, and avoid a bias in the query response that may be present in conventional product retrieval techniques due to encoding unstructured text and structured metadata using a same encoder.

A method, apparatus, non-transitory computer readable medium, and system for product retrieval are described. One or more aspects of the method, apparatus, non-transitory computer readable medium, and system include receiving a query that includes a text description of a product associated with a brand; identifying the product based on the query by comparing the text description to a product embedding of the product, wherein the product embedding is based on a brand embedding of the brand; and displaying product information for the product in response to the query, wherein the product information includes the brand.

A method, apparatus, non-transitory computer readable medium, and system for product retrieval are described. One or more aspects of the method, apparatus, non-transitory computer readable medium, and system include receiving a training set comprising an image, unstructured text describing the image, and structured metadata corresponding to the image; encoding the image and the unstructured text to obtain an image embedding and an image description embedding; encoding the structured metadata to obtain an entity embedding; combining the entity embedding and the image description embedding to obtain a combined embedding; computing a loss based on the combined embedding and the image embedding; and updating parameters of the multi-modal encoder based on the loss.

An apparatus and system for product retrieval are described. One or more aspects of the apparatus and system include a multi-modal encoder configured to encode an image and unstructured text to obtain an image embedding and an image description embedding; an entity encoder configured to encode the structured metadata to obtain an entity embedding; an entity selector configured to weight the entity embedding based on a plurality of entities and the structured metadata to obtain a weighted entity embedding; and an entity-aware module configured to combine the entity embedding and the image description embedding to obtain a combined embedding.

BRIEF DESCRIPTION OF THE DRAWINGS

FIG. 11 shows an example of a comparison of the general domain and the product domain according to aspects of the present disclosure.

DETAILED DESCRIPTION

Figure 1:
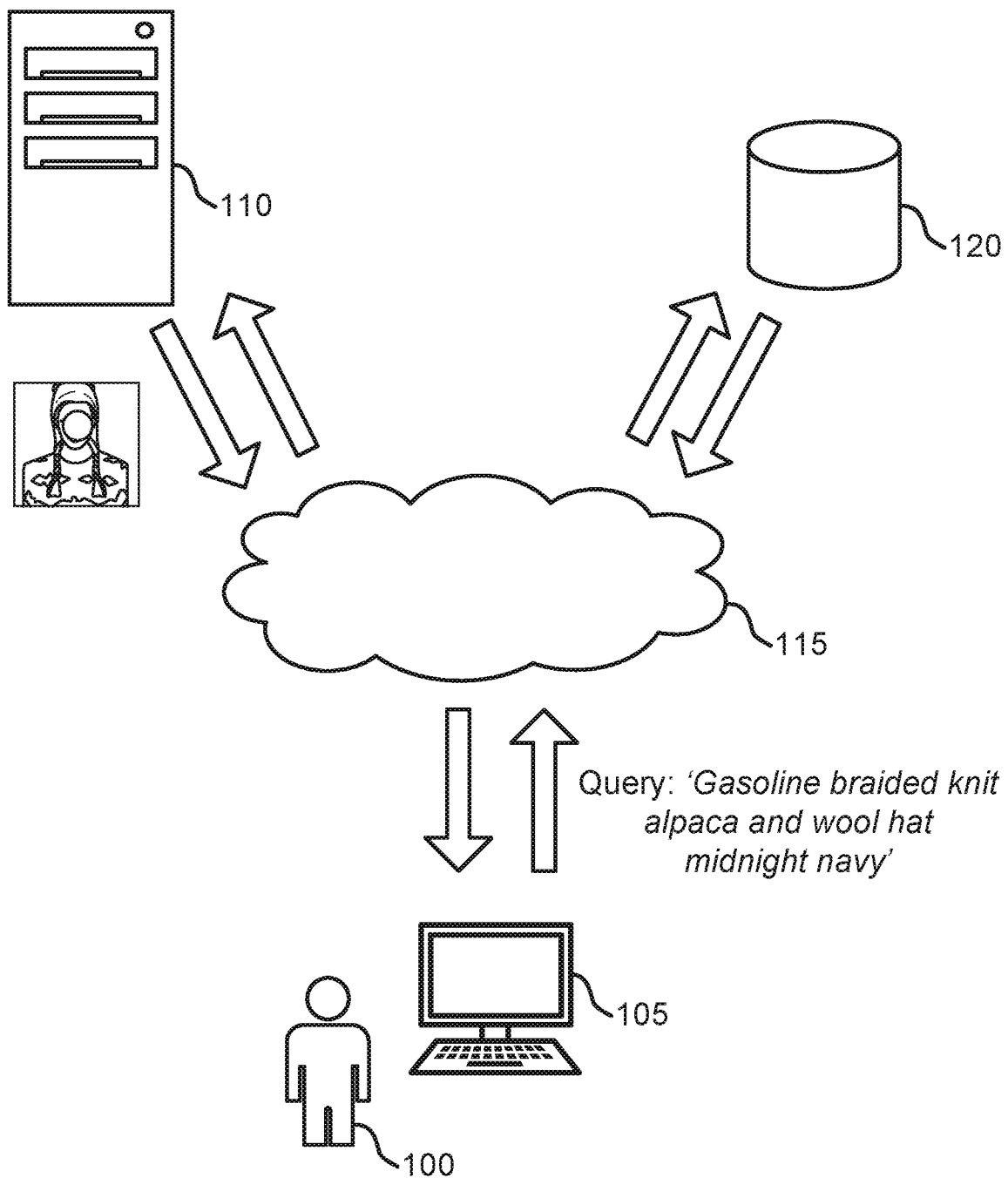
FIG. 1 shows an example of a product retrieval system according to aspects of the present disclosure.

Cross-modal retrieval refers to a machine learning technique of retrieving an image in response to a text query, or text in response to an image query. In cross-modal retrieval, text and images can be represented as vectors in a same feature space, such that text can be matched with an image by determining a probability that an associated text vector and image vector match by computing a distance between the two vectors.

Conventional cross-modal retrieval techniques can be applied to general retrieval tasks, or to more specialized retrieval tasks, such as product retrieval. Product retrieval refers to retrieving product information in response to a query. However, conventional product retrieval techniques may include biases that negatively impact their ability to return product information that matches the query. There is therefore a need in the art for product retrieval systems and methods that are able to more accurately return product information.

The present disclosure provides systems and methods for product retrieval. In at least one embodiment, a product retrieval apparatus includes a query component that receives a text description of a product associated with a brand. In at least one embodiment, the product retrieval apparatus includes a retrieval component that uses machine learning techniques to identify the product based on the query by comparing the text description to a product embedding of the product. In some embodiments, the product embedding is based on a brand embedding of the brand. In at least one embodiment, the query component displays product information for the product in response to the query. In some embodiments, the product information includes the brand.

In a product retrieval context, a product image often only includes one or two foreground objects and a plain background. Region of Interest (RoI) techniques are popular for general cross-modal retrieval tasks, but detect unsatisfactory region proposals when applied to a product retrieval task, by detecting either repeated object regions or sub-regions that are irrelevant to the product. Conventional product retrieval techniques such as FashionBERT and KaleidoBERT may therefore retain more raw pixel level information compared to object RoI techniques by extracting a sequence of multi-grained image patches to enhance cross-modality learning. However, in the product domain, product datasets may include image-text pairs that include metadata that describes the image, such as product title/description, brand, category, composition, fit, etc., and the conventional product retrieval techniques may simply concatenate the metadata to form a long sentence to be fed into their models, where each piece of metadata receives equal importance. This may bias conventional product retrieval models to return inaccurate search results based on spurious correlations between misleading metadata, text descriptions, and images in image-text pairs.

In contrast, embodiments of the present disclosure identify the product by comparing a text description of the product including the brand to a product embedding of the product, where the product embedding is based on a brand embedding of the brand. By focusing on the brand as the point of comparison between the query and the product, at least one embodiment of the present disclosure avoids using metadata that biases the retrieval process toward an incorrect response due to the presence of spurious correlations between an image, unstructured text, and structured metadata in a product dataset. In some embodiments, the product embedding is computed based on a weighted embedding of metadata, such that only metadata that is relevant to returning an accurate search result is included in the product embedding.

Furthermore, conventional product retrieval techniques may be biased due to pre-training of their models on a large general domain corpus. For example, a metadata entity "Gasoline" in a conventional pre-trained product retrieval model may be strongly associated with the concept of "fuel", while in a product retrieval domain, "Gasoline" may instead be tagged as a brand entity value. Other examples include "California Goose (brand)", "top (category)", etc. This out-of-distribution problem may be approached from a causal inference viewpoint, in which the metadata may be considered as "confounders" that form possibly spurious correlations between image and language when tokens in the metadata are learned from the general domain corpus. However, conventional product retrieval techniques that take the causal inference approach follow a traditional BERT token vocabulary, treating each entity as a group of (sub)word tokens. This may overlook a large collection of special-meaning entities in product retrieval, such as "Gasoline (brand)", "top (category)", "relaxed (fit)", etc. Moreover, this approach may intertwine different entities with shared confounding (sub)word tokens, such as "California Goose".

In contrast, in least one embodiment, the product retrieval apparatus includes a multi-modal encoder that encodes a product description to obtain a product embedding, an entity encoder that encodes structured metadata to obtain an entity embedding, and an entity-aware module that combines the entity embedding and the product description to obtain a combined embedding. The multi-modal encoder computes the product embedding based on the combined embedding. By separately encoding the product description using the multi-modal encoder and the structured metadata using the entity encoder, the product retrieval apparatus avoids applying a misleading "commonsense" understanding of tokens that may be present in the multi-modal encoder due to a pre-training process. By combining the product description and the entity embedding and computing the product embedding based on the combined embedding, the product retrieval apparatus may thereby retrieve more accurate product information than conventional product retrieval techniques.

At least one embodiment of the present disclosure is used in the product retrieval context. In an example, the system retrieves a query from a user relating to a product and returns product information to the user. An example application of the present disclosure in the product retrieval context is described with reference to FIGS. 1 and 4. Details regarding the architecture of a product retrieval system and apparatus are provided with reference to FIGS. 1-3. Examples of a process for product retrieval are provided with reference to FIGS. 4-9. Examples of a process for training a machine learning model are provided with reference to FIGS. 10-12.

Product Retrieval System

Figure 2:
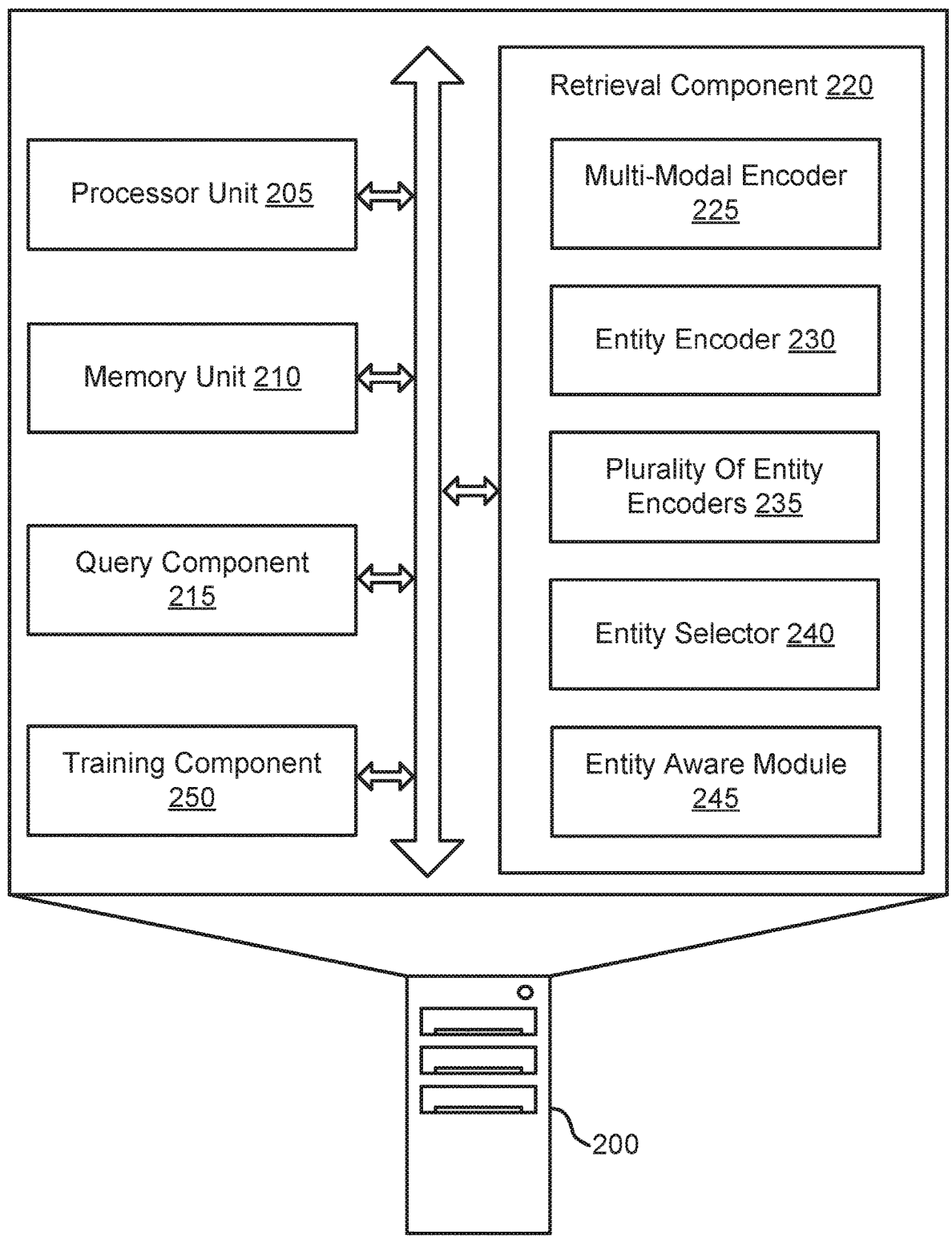
FIG. 2 shows an example of a product retrieval apparatus according to aspects of the present disclosure.
Figure 3:
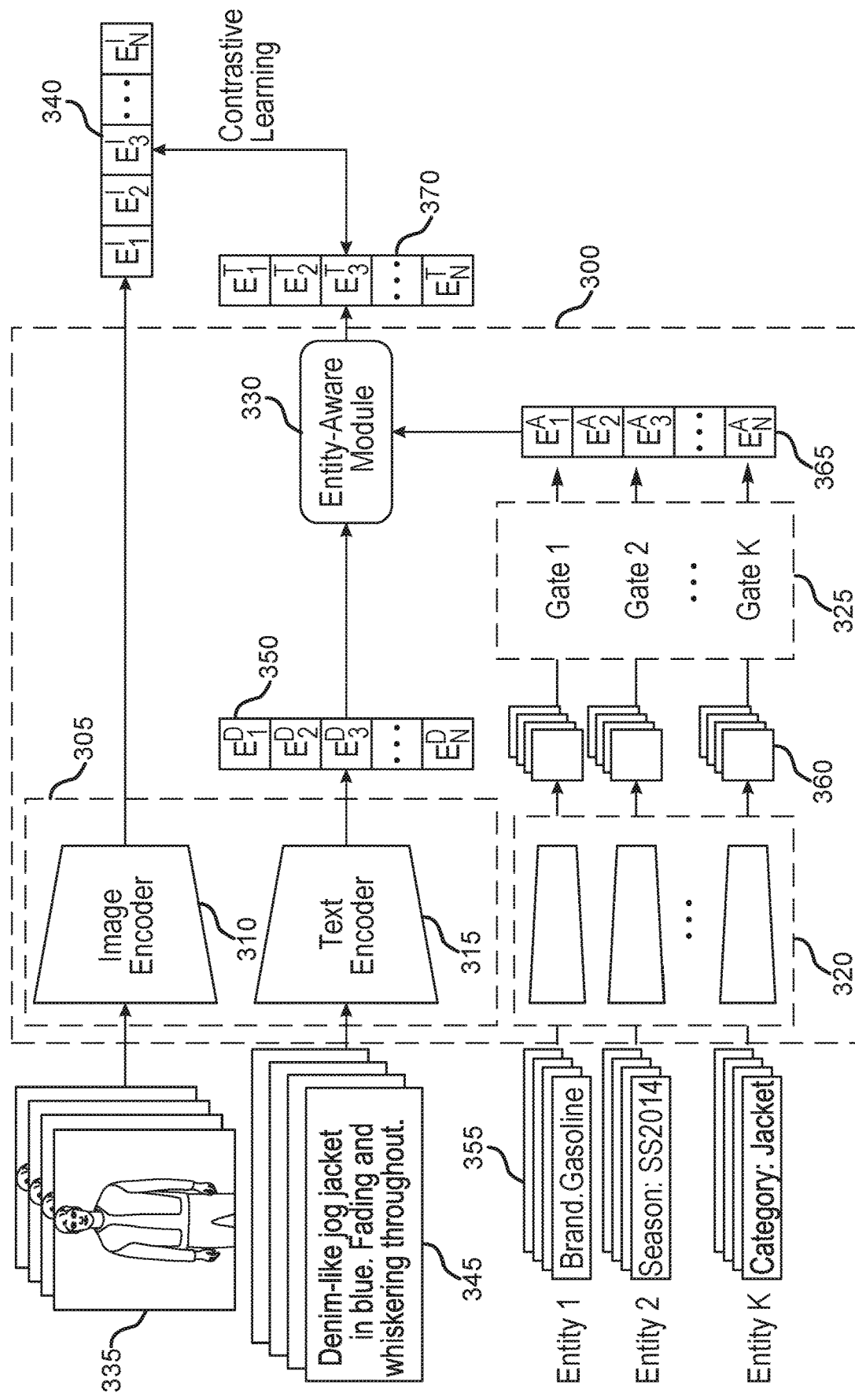
FIG. 3 shows an example of a retrieval component according to aspects of the present disclosure.

In FIGS. 1-3, an apparatus and system for product retrieval is described. One or more aspects of the apparatus and system include a multi-modal encoder configured to encode an image and unstructured text to obtain an image embedding and an image description embedding; an entity encoder configured to encode the structured metadata to obtain an entity embedding; an entity selector configured to weight the entity embedding based on a plurality of entities and the structured metadata to obtain a weighted entity embedding; and an entity-aware module configured to combine the entity embedding and the image description embedding to obtain a combined embedding.

Some examples of the apparatus and system further include an image encoder of the multi-modal encoder configured to encode the image to obtain the image embedding. Some examples of the apparatus and system further include a text encoder of the multi-modal encoder configured to encode the unstructured text to obtain the image description embedding. Some examples of the apparatus and system further include a plurality of entity encoders, wherein each of the plurality of entity encoders corresponds to an entity type of the structured metadata. Some examples of the apparatus and system further include a training component configured to update parameters of the multi-modal encoder based on a loss function.

FIG. 1 shows an example of a product retrieval system according to aspects of the present disclosure. The example shown includes user 100, user device 105, product retrieval apparatus 110, cloud 115, and database 120. Product retrieval apparatus 110 is an example of, or includes aspects of, the corresponding element described with reference to FIG. 2.

Referring to FIG. 1, in an example, the system is used in the product retrieval context. User 100 provides a query describing a product associated with a brand (such as "Gasoline braided knit alpaca and wool hat midnight navy")

to the system, and the system returns product information for the product to user 100 in response to the query.

According to some aspects, user device 105 is a personal computer, laptop computer, mainframe computer, palmtop computer, personal assistant, mobile device, or any other suitable processing apparatus. In some examples, user device 105 includes software that displays a graphical user interface in response to an instruction received from product retrieval apparatus 110. In some embodiments, the graphical user interface is configured to receive a text input or an image input from user 100, and display text and images. In an example, the graphical user interface is provided as a website via a browser, as a smartphone or tablet app, in an executable program, etc.

According to some aspects, a user interface enables user 100 to interact with user device 105. In some embodiments, the user interface may include an audio device, such as an external speaker system, an external display device such as a display screen, or an input device (e.g., a remote control device interfaced with the user interface directly or through an IO controller module). In some cases, the user interface may be a graphical user interface (GUI).

According to some aspects, product retrieval apparatus 110 includes a computer implemented network. In some embodiments, the computer implemented network includes a machine learning model including one or more neural networks. In some embodiments, product retrieval apparatus 110 also includes one or more processors, a memory subsystem, a communication interface, an I/O interface, one or more user interface components, and a bus. Additionally, in some embodiments, product retrieval apparatus 110 communicates with user device 105 and database 120 via cloud 115.

In some cases, product retrieval apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, a server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

According to some aspects, product retrieval apparatus 110 is implemented as user device 105, and user 100 directly interacts with product retrieval apparatus 110 via a graphical user interface displayed on a screen included in product retrieval apparatus 110.

Further detail regarding the architecture of product retrieval apparatus 110 is provided with reference to FIGS. 2-3. Further detail regarding a process for cross-modal product retrieval is provided with reference to FIGS. 4-9. Further detail regarding a process for training the machine learning model is provided with reference to FIGS. 10-12. Product retrieval apparatus 110 is an example of, or includes aspects of, the corresponding element described with reference to FIG. 2.

A cloud such as cloud 115 is a computer network configured to provide on-demand availability of computer system resources, such as data storage and computing power. In some examples, cloud 115 provides resources without active management by user 100. The term "cloud" is sometimes used to describe data centers available to many users over the Internet. Some large cloud networks have functions distributed over multiple locations from central servers. A server is designated as an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some aspects, cloud 115 provides communications between user device 105, product retrieval apparatus 110, and database 120.

A database such as database 120 is an organized collection of data. For example, database 120 stores data in a specified format known as a schema. According to some aspects, database 120 is structured as a single database, a distributed database, multiple distributed databases, or an emergency backup database. In some cases, a database controller manages data storage and processing in database 120. In some cases, user 100 interacts with the database controller. In other cases, the database controller operates automatically without user interaction. According to some aspects, database 120 stores information such as the dataset described with reference to FIGS. 8 and 9, the training dataset described with reference to FIGS. 10 and 12, and associations between images, unstructured text, and structured metadata included in the dataset and the training dataset. According to some aspects, database 120 stores the various outputs (such as embeddings and similarity scores) generated by components of product retrieval apparatus 110. In some embodiments, database 120 is external to product retrieval apparatus 110 and communicated with product retrieval apparatus 110 via cloud 115. In some embodiments, database 120 is included in product retrieval apparatus 110.

FIG. 2 shows an example of a product retrieval apparatus according to aspects of the present disclosure. Product retrieval apparatus 200 is an example of, or includes aspects of, the corresponding element described with reference to FIG. 1. In one aspect, product retrieval apparatus 200 includes processor unit 205, memory unit 210, query component 215, retrieval component 220, and training component 250.

Processor unit 205 includes one or more processors. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special purpose components for modem processing, baseband processing, digital signal processing, or transmission processing.

Memory unit 210 includes one or more memory devices. Examples of a memory device include random access memory (RAM), read-only memory (ROM), or a hard disk.

Examples of memory devices include solid state memory and a hard disk drive. In some examples, memory is used to store computer-readable, computer-executable software including instructions that, when executed, cause a processor of processor unit 205 to perform various functions described herein. In some cases, memory unit 210 contains, among other things, a basic input/output system (BIOS) which controls basic hardware or software operation such as the interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, query component 215 receives a query that includes a text description of a product associated with a brand. In some examples, query component 215 displays product information for the product in response to the query, where the product information includes the brand. In some aspects, the text description does not include the brand. In some examples, query component 215 displays an image of the product in response to the query. According to some aspects, query component 215 is implemented as a hardware circuit, as firmware, or as software.

According to some aspects, retrieval component 220 identifies the product based on the query by comparing the text description to a product embedding of the product, where the product embedding is based on a brand embedding of the brand. Retrieval component 220 is an example of, or includes aspects of, the corresponding element described with reference to FIG. 3. According to some aspects, retrieval component 220 is implemented as a hardware circuit, as firmware, or as software.

In one aspect, retrieval component 220 is a machine learning model that includes one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations. During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In one aspect, retrieval component 220 includes multi-modal encoder 225, entity encoder 230, plurality of entity encoders 235, entity selector 240, and entity-aware module 245. In one aspect, each of multi-modal encoder 225, entity encoder 230, plurality of entity encoders 235, entity selector 240, and entity-aware module 245 includes one or more ANNs. According to some aspects, retrieval component 220 is implemented as a hardware circuit, as firmware, or as software.

According to some aspects, multi-modal encoder 225 encodes the text description to obtain a text embedding. In some examples, multi-modal encoder 225 encodes a product description to obtain a product description embedding. In some examples, multi-modal encoder 225 encodes an image of the product to obtain an image embedding. In some examples, multi-modal encoder 225 combines the image embedding with the brand embedding to obtain the product embedding.

According to some aspects, multi-modal encoder 225 identifies a set of candidate products, where each of the candidate products is associated with a candidate product embedding. In some examples, multi-modal encoder 225 compares the text embedding to the candidate product embedding for each of the set of candidate products.

According to some aspects, multi-modal encoder 225 receives a training set including an image, unstructured text describing the image, and structured metadata corresponding to the image. In some examples, multi-modal encoder 225 encodes the image and the unstructured text to obtain an image embedding and an image description embedding.

According to some aspects, multi-modal encoder 225 is configured to encode an image and unstructured text to obtain an image embedding and an image description embedding. Multi-modal encoder 225 is an example of, or includes aspects of, the corresponding element described with reference to FIG. 3. According to some aspects, multi-modal encoder 225 is implemented as a hardware circuit, as firmware, or as software.

According to some aspects, multi-modal encoder 225 is implemented as a Contrastive Language-Image Pre-Training (CLIP) model. CLIP is pre-trained to efficiently learn visual concepts from natural language supervision. CLIP can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets. A CLIP model can be applied to nearly arbitrary visual classification tasks so that the model may predict the likelihood of a text description being paired with a particular image, thereby removing the need for users to design their own classifiers and the need for task-specific training data. For example, a CLIP model can be applied to a new task by inputting names of the task's visual concepts to the model's text encoder. The model can then output a linear classifier of CLIP's visual representations.

In some examples, entity encoder 230 identifies structured metadata for the product including a set of key-value pairs, where one of the key-value pairs specifies the brand. In some examples, entity encoder 230 encodes structured metadata to obtain an entity embedding. In some examples, entity encoder 230 identifies a set of entities in the structured metadata, where the set of entities includes the brand.

According to some aspects, entity encoder 230 encodes the structured metadata to obtain an entity embedding. In some examples, entity encoder 230 identifies a set of entities in the structured metadata.

According to some aspects, entity encoder 230 is configured to encode the structured metadata to obtain an entity embedding. According to some aspects, entity encoder 230 is implemented as a hardware circuit, as firmware, or as software.

According to some aspects, plurality of entity encoders 235 encodes each of the set of entities to obtain a set of individual entity embeddings, where the set of individual entity embeddings includes the brand embedding. In some examples, plurality of entity encoders 235 provides the set of individual entity embeddings to entity selector 240, where the entity selector 240 includes a gate network that outputs the entity embedding.

According to some aspects, plurality of entity encoders 235 includes entity encoder 230 and other entity encoders that are structurally similar to entity encoder 230, where each of the plurality of entity encoders 235 corresponds to an entity type of the structured metadata. Plurality of entity encoders 235 is an example of, or includes aspects of, the corresponding element described with reference to FIG. 3.

According to some aspects, entity selector 240 combines the set of individual entity embeddings to obtain the entity embedding. According to some aspects, entity selector 240 is configured to weight the entity embedding based on a plurality of entities and the structured metadata to obtain a weighted entity embedding. According to some aspects, entity selector 240 includes a gate network that outputs the entity embedding.

According to some aspects, entity selector 240 is configured to weight the entity embedding based on a plurality of entities and the structured metadata to obtain a weighted entity embedding. Entity selector 240 is an example of, or includes aspects of, the corresponding element described with reference to FIG. 3. According to some aspects, entity selector 240 is implemented as a hardware circuit, as firmware, or as software.

According to some aspects, entity-aware module 245 combines the entity embedding and the product description embedding to obtain a combined embedding, where the product embedding is based on the combined embedding. According to some aspects, entity-aware module 245 combines the entity embedding and the image description embedding to obtain a combined embedding.

According to some aspects, entity-aware module 245 is configured to combine the entity embedding and the image description embedding to obtain a combined embedding. Entity-aware module 245 is an example of, or includes aspects of, the corresponding element described with reference to FIG. 3. According to some aspects, entity-aware module 245 is implemented as a hardware circuit, as firmware, or as software.

According to some aspects, training component 250 computes a loss based on the combined embedding and the image embedding. In some examples, training component 250 updates parameters of multi-modal encoder 225 based on the loss. In some examples, training component 250 identifies the image and the unstructured text as a positive sample pair. In some examples, training component 250 identifies an additional image and an additional unstructured text as a negative sample pair, where the additional image is not associated with the additional unstructured text.

In some examples, training component 250 computes a contrastive learning loss based on the positive sample pair and the negative sample pair. In some aspects, the contrastive learning loss is based on the image embedding and the combined embedding. In some aspects, the contrastive learning loss is based on the image embedding and the image description embedding. In some aspects, the contrastive learning loss is based on the image embedding and the entity embedding.

According to some aspects, training component 250 is configured to update parameters of the multi-modal encoder 225 based on a loss function. According to some aspects, training component 250 is implemented as a hardware circuit, as firmware, or as software.

FIG. 3 shows an example of a retrieval component according to aspects of the present disclosure. The example shown includes retrieval component 300, image 335, image embedding 340, unstructured text 345, image description embedding 350, plurality of entities 355, plurality of individual entity embeddings 360, entity embedding 365, and combined embedding 370.

According to some aspects, image 335, unstructured text 345, and plurality of entities 355 are included in a training set as described with reference to FIG. 10. In an example, unstructured text 345 is unstructured (e.g., natural language) text describing image 335, and plurality of entities 355 is included in structured metadata corresponding to image 335. As shown as an FIG. 3, text description 345 includes the text "Denim-like jog jacket in blue. Fading and whiskering throughout". Plurality of entities 355 includes entity 1 through entity K. In some embodiments, each entity is a metadata tag such as a key-value pair that corresponds to an aspect of the corresponding image. In this case, entity 1 is a metadata tag that includes the key "Brand" and the value of "Gasoline", entity 2 includes the key "Season" and the value of "SS2014", and entity K includes the key "Category" and the value of "Jacket". As used herein, a key is also referred to as an entity type.

According to some aspects, in a training set, an unstructured text description and structured metadata corresponding to an image are added to the image as metadata. According to some aspects, in a training set, an entry in a data schema associates an unstructured text description and structured metadata corresponding to an image.

Referring to FIG. 3, retrieval component 300 generates information that is used for a contrastive learning process implemented by a training component described with reference to FIG. 2. Retrieval component 300 is an example of, or includes aspects of, the corresponding element described with reference to FIG. 2. In one aspect, retrieval component 300 includes multi-modal encoder 305, plurality of entity encoders 320, entity selector 325, and entity-aware module 330.

Multi-modal encoder 305 is an example of, or includes aspects of, the corresponding element described with reference to FIG. 2. In one aspect, multi-modal encoder 305 includes image encoder 310 and text encoder 315. According to some aspects, image encoder 310 of the multi-modal encoder 305 is configured to encode the image 335 to obtain the image embedding 340. In some embodiments, image encoder 310 obtains image embedding 340 as described with reference to FIGS. 8 and 9. According to some aspects, text encoder 315 of the multi-modal encoder 305 is configured to encode unstructured text 345 to obtain image description embedding 350. In some embodiments, text encoder 315 obtains image description embedding 350 as described with reference to FIGS. 8 and 10.

Plurality of entity encoders 320 is an example of, or includes aspects of, the corresponding element described with reference to FIG. 2. According to some aspects, plurality of entity encoders 320 is configured to encode each of plurality of entities 355 to obtain plurality of individual entity embeddings 360, where each entity encoder of plurality of entity encoders 320 corresponds to an entity type of plurality of entities 355. In some embodiments, plurality of entity encoders obtains plurality of individual entity embeddings 360 as described with reference to FIG. 9.

Entity selector 325 is an example of, or includes aspects of, the corresponding element described with reference to FIG. 2. According to some aspects, entity selector 325 is configured to combine plurality of individual entity embeddings 360 to obtain entity embedding 365. In an example, entity selector 325 includes a gate network including, for example, Gate 1 to Gate K, that outputs entity embedding 365. In some embodiments, entity selector 325 obtains entity embedding 365 as described with reference to FIG. 9.

Entity-aware module 330 is an example of, or includes aspects of, the corresponding element described with reference to FIG. 2. According to some aspects, entity-aware module 330 is configured to combine entity embedding 365 and image description embedding 350 to obtain combined embedding 370. In some embodiments, entity-aware module 330 obtains combined embedding 370 as described with reference to FIGS. 8 and 10.

According to some aspects, a training component described with reference to FIG. 2 is configured to compute a contrastive learning loss based on combined embedding 370 and image embedding 340. In some embodiments, the training component computes the contrastive learning loss as described with reference to FIGS. 10 and 12. According to some aspects, the training component is configured to update parameters of multi-modal encoder 305 based on the contrastive learning loss. In some embodiments, the training component updates the parameters of multi-modal encoder 305 as described with reference to FIG. 10.

FIG. 3 shows a training set with a batch size of N, where image 335 is image 1, unstructured text 345 is unstructured text 1, and plurality of entities 355 are plurality of entities 1. Image 1, unstructured text 1, and plurality of entities 1 are illustrated in the foreground, and subsequent images, unstructured texts, and pluralities of entities included in the training set are illustrated in the background. FIG. 3 shows that each Nth input corresponds to an Nth output embedding.

Product Retrieval

In FIGS. 4-9, a method for product retrieval is described. One or more aspects of the method include receiving a query that includes a text description of a product associated with a brand; identifying the product based on the query by comparing the text description to a product embedding of the product, wherein the product embedding is based on a brand embedding of the brand; and displaying product information for the product in response to the query, wherein the product information includes the brand. In some aspects, the text description does not include the brand.

Some examples of the method further include encoding the text description to obtain a text embedding. Some examples further include identifying a plurality of candidate products, wherein each of the candidate products is associated with a candidate product embedding. Some examples further include comparing the text embedding to the candidate product embedding for each of the plurality of candidate products.

Some examples of the method further include displaying an image of the product in response to the query. Some examples of the method further include identifying structured metadata for the product including a plurality of key-value pairs, wherein one of the key-value pairs specifies the brand.

Some examples of the method further include encoding a product description to obtain a product description embedding. Some examples further include encoding structured metadata to obtain an entity embedding. Some examples further include combining the entity embedding and the product description embedding to obtain a combined embedding, wherein the product embedding is based on the combined embedding.

Some examples of the method further include identifying a plurality of entities in the structured metadata, wherein the plurality of entities includes the brand. Some examples further include encoding each of the plurality of entities to obtain a plurality of individual entity embeddings, wherein the plurality of individual entity embeddings includes the brand embedding. Some examples further include combining the plurality of individual entity embeddings to obtain the entity embedding.

Some examples of the method further include encoding an image of the product to obtain an image embedding. Some examples further include combining the image embedding with the brand embedding to obtain the product embedding.

Figure 4:
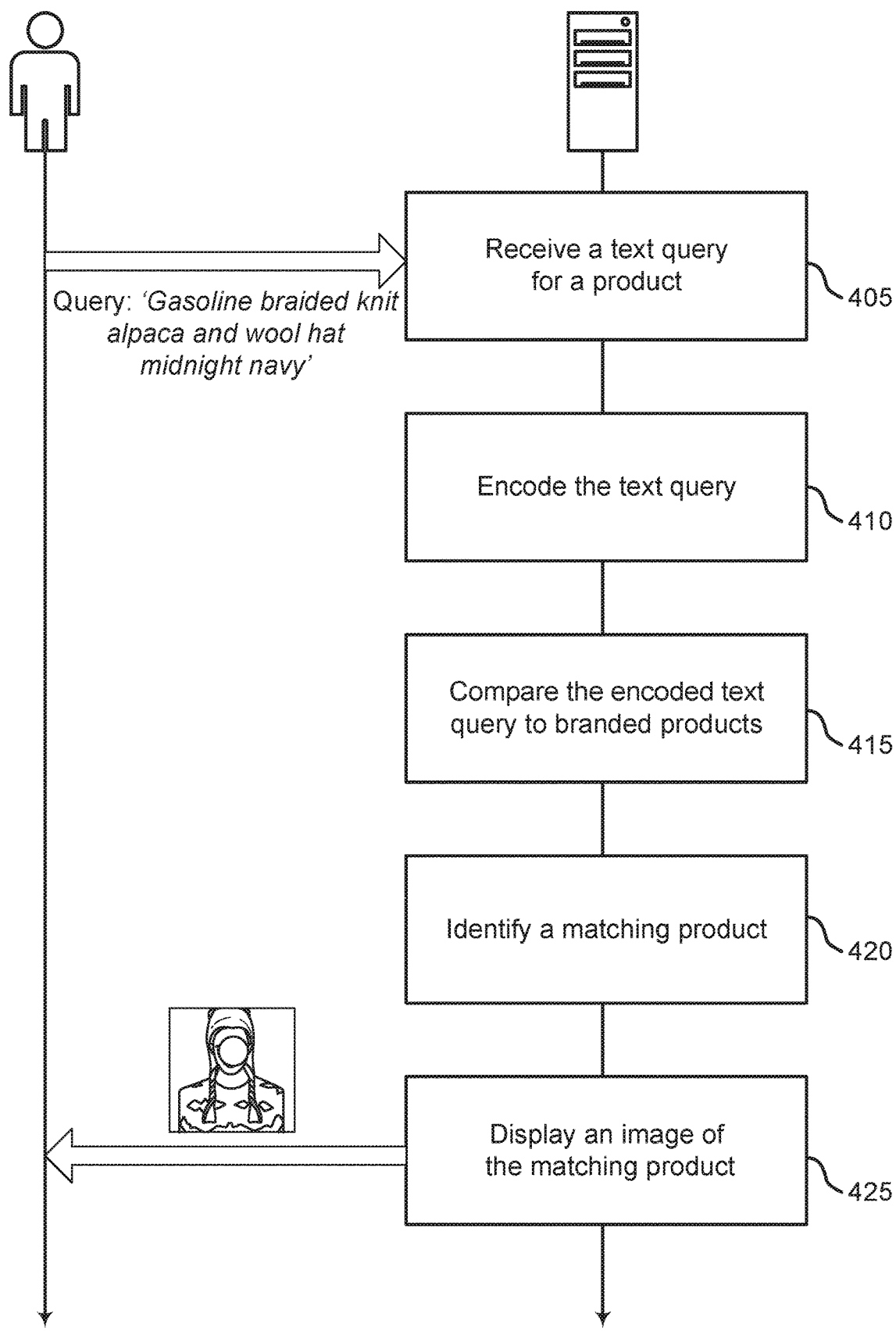
FIG. 4 shows an example of product retrieval according to aspects of the present disclosure.

FIG. 4 shows an example of product retrieval according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 4, the system is used in the product retrieval context. In an example, the system receives a query that describes a product from a user and returns an image of the product in response to the query.

At operation 405, the system receives a text query for a product. In some cases, the operations of this step refer to, or may be performed by, a product retrieval apparatus as described with reference to FIGS. 1 and 2. For example, the user inputs the text query to a graphical user interface provided by a query component described with reference to FIG. 2, and the query component thereby receives the text query for the product. In an example, the text query is an unstructured (e.g. natural language) sentence "Gasoline braided knit alpaca and wool hat midnight navy".

At operation 410, the system encodes the text query. In some cases, the operations of this step refer to, or may be performed by, a product retrieval apparatus as described with reference to FIGS. 1 and 2. In some embodiments, the product retrieval apparatus encodes the text query as described with reference to FIG. 8.

At operation 415, the system compares the encoded text query to branded products. In some cases, the operations of this step refer to, or may be performed by, a product retrieval apparatus as described with reference to FIGS. 1 and 2. In some embodiments, the product retrieval apparatus compares the encoded text query to branded products (e.g., products associated with a brand entity) as described with reference to FIG. 9.

At operation 420, the system identifies a matching product. In some cases, the operations of this step refer to, or may be performed by, a product retrieval apparatus as described with reference to FIGS. 1 and 2. In some embodiments, the product retrieval apparatus identifies a matching product (e.g., a product that matches the query) as described with reference to FIG. 9.

At operation 425, the system displays an image of the matching product. In some cases, the operations of this step refer to, or may be performed by, a product retrieval apparatus as described with reference to FIGS. 1 and 2. In an example, the query component displays image of the matching product via the graphical user interface.

Figure 5:
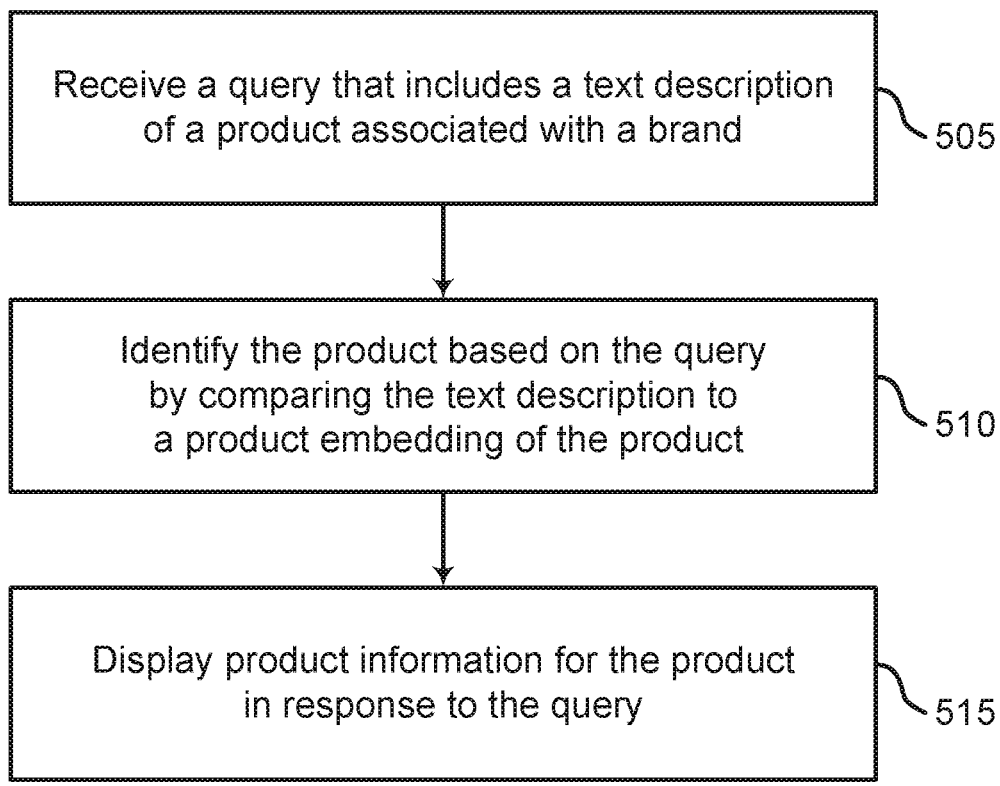
FIG. 5 shows an example of displaying product information in response to a query according to aspects of the present disclosure.

FIG. 5 shows an example of displaying product information in response to a query according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, the system returns product information in response to a query. According to some aspects, a query component described with reference to FIG. 2 receives a query that includes a text description of a product associated with a brand, and a retrieval component described with reference to FIG. 2 identifies a product that matches the query by comparing the text description to a product embedding of the product. In some embodiments, the product embedding includes a brand embedding of the brand. After the retrieval component identifies the product information that matches the query, the query component displays the product information to the user.

Figure 7:
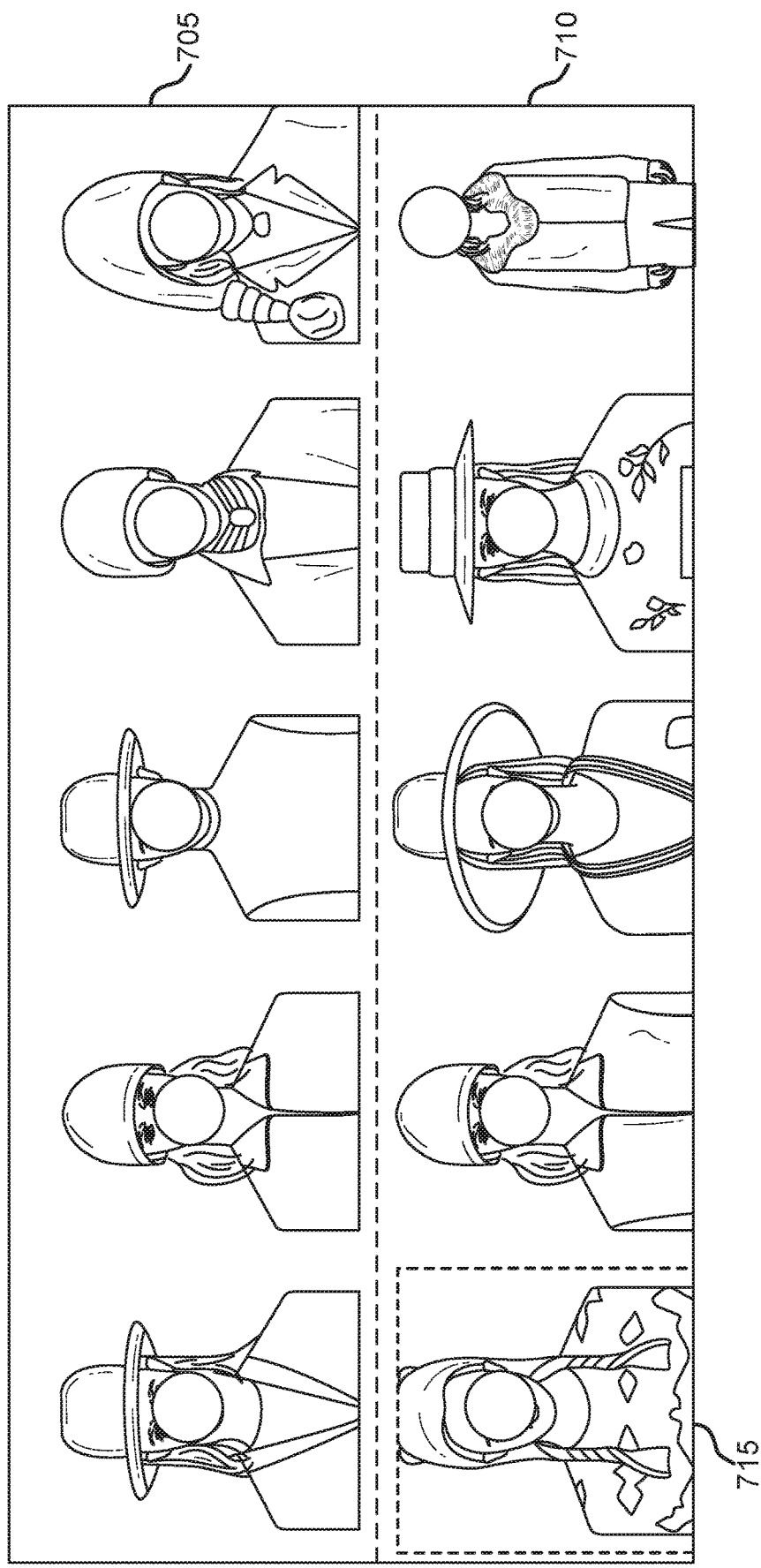
FIG. 7 shows an example of cross-modal query results according to aspects of the present disclosure.

At operation 505, the system receives a query that includes a text description of a product associated with a brand. In some cases, the operations of this step refer to, or may be performed by, a query component as described with reference to FIG. 2. In an example, the query component displays a graphical user interface that includes a visual element that accepts a natural language text input from a user. In some embodiments, the query component displays the graphical user interface on a display that is included in a product retrieval apparatus described with reference to FIGS. 1-3, or displays the graphical user interface on a user device described with reference to FIG. 1. Referring to FIG. 7, an example query is "Gasoline braided knit alpaca and wool hat midnight navy", where Gasoline is a brand. In some embodiments, the text description does not include the brand. For example, the query in FIG. 7 may instead be "braided knit alpaca and wool hat midnight navy".

At operation 510, the system identifies the product based on the query by comparing the text description to a product embedding of the product, where the product embedding is based on a brand embedding of the brand. In some cases, the operations of this step refer to, or may be performed by, a retrieval component as described with reference to FIGS. 2 and 3. According to some aspects, the query component passes the query to the retrieval component. According to some aspects, the retrieval component determines a product embedding as described with reference to FIG. 8. According to some aspects, the retrieval component determines a brand embedding as described with reference to FIG. 9. According to some aspects, the retrieval component identifies the product as described with reference to FIG. 6.

At operation 515, the system displays product information for the product in response to the query, where the product information includes the brand. In some cases, the operations of this step refer to, or may be performed by, a query component as described with reference to FIG. 2. According to some aspects, the retrieval component passes the identified product to the query component, and the query component displays the product information for the product via the graphical user interface. In some embodiments, the product information includes one or more of an image depicting the product, unstructured text describing the product, and structured metadata that describes the product, including at least a value of a key-value pair in which the key is "Brand" and the value is the name of the brand (e.g., "Gasoline").

Figure 6:
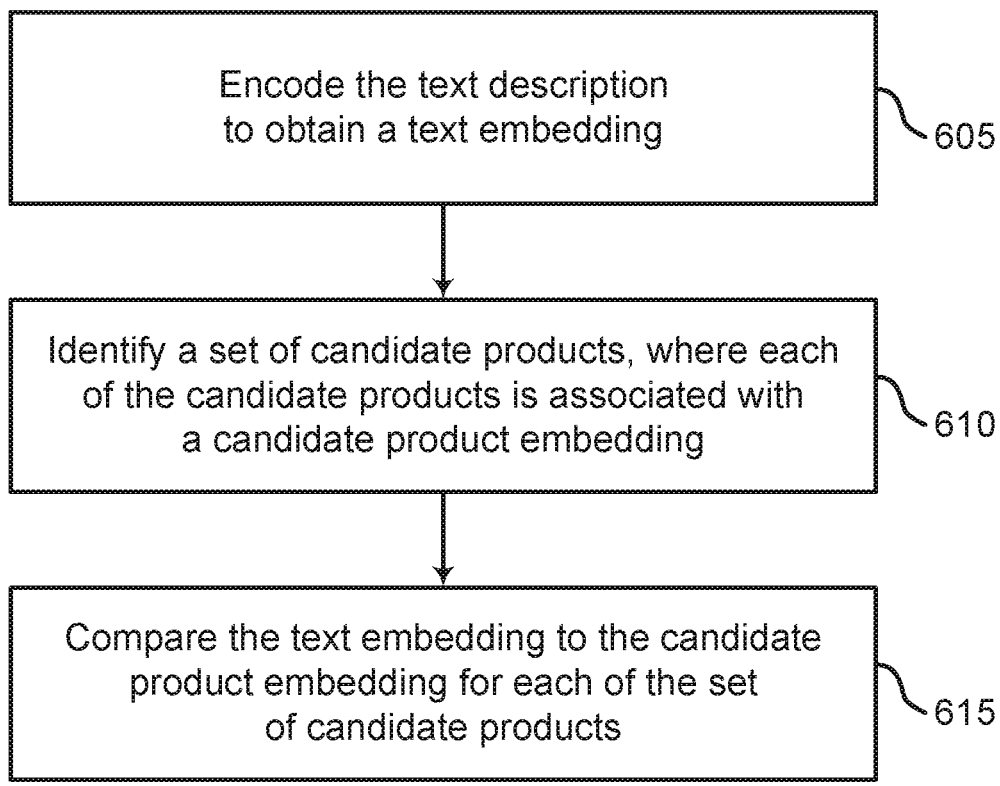
FIG. 6 shows an example of comparing candidate product embeddings according to aspects of the present disclosure.

FIG. 6 shows an example of comparing candidate product embeddings according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, the system identifies a product that matches a query by comparing the query with a set of candidate products.

At operation 605, the system encodes the text description to obtain a text embedding. In some cases, the operations of this step refer to, or may be performed by, a multi-modal encoder as described with reference to FIGS. 2 and 3. For example, a text encoder of the multi-modal encoder receives the query including the text description from a query component described with reference to FIG. 2 and obtains a text embedding (e.g., a vector representation) of the text description by encoding the text description.

At operation 610, the system identifies a set of candidate products, where each of the candidate products is associated with a candidate product embedding. In some cases, the operations of this step refer to, or may be performed by, a multi-modal encoder as described with reference to FIG. 2. For example, each candidate product in the set of candidate products is a product depicted in an image included in one or more datasets described with reference to FIG. 8, and each candidate product embedding is a product embedding corresponding to the product described with reference to FIG. 8. In some examples, the multi-modal encoder identifies a set of candidate products by retrieving the set of candidate product embeddings from a database described with reference to FIG. 1, where each candidate product is associated with a candidate product embedding according to a data schema. In some examples, a candidate product embedding is determined based on an entity embedding that is obtained as described with reference to FIG. 9.

At operation 615, the system compares the text embedding to the candidate product embedding for each of the set of candidate products. In some cases, the operations of this step refer to, or may be performed by, a multi-modal encoder as described with reference to FIGS. 2 and 3. In an example, the multi-modal encoder computes a similarity score between the text embedding and each candidate product embedding, and compares the resulting similarity score to determine a ranked order of similarities corresponding to each text embedding-candidate product embedding pair. In some embodiments, the multi-modal encoder identifies the candidate product embedding associated with the highest similarity score as the product, and thereby identifies the product. According to some aspects, the multi-modal encoder determines the similarity score according to various suitable functions that determine a similarity between two embeddings, such as a cosine similarity function and the like.

FIG. 7 shows an example of cross-modal query results according to aspects of the present disclosure. The example shown includes comparative example query results 705, top-five query results 710, and top query result 715.

Referring to FIG. 7, comparative example query results 705 are results that may be returned by conventional product retrieval techniques in response to the query "Gasoline braided knit alpaca and wool hat midnight navy". Due to the use of one or more of a general-domain trained encoder that encodes both unstructured text and structured metadata corresponding to a product together, biasing the encoder away from a product-domain understanding of the structured metadata towards a commonsense understanding, or an encoder that encodes a concatenation of individual metadata in the structured metadata without accounting for the presence of confounders in the metadata, biasing the encoder towards an incorrect probability that a given image matches given text, comparative example query results 705 do not include an image that matches the query. In contrast, embodiments of the present disclosure return the correct product information as top query result 715 in response to the query. Top query result 715, and the four other results included in top-five query results 710, are determined based on ranked similarity scores generated as described with reference to FIG. 7.

Figure 8:
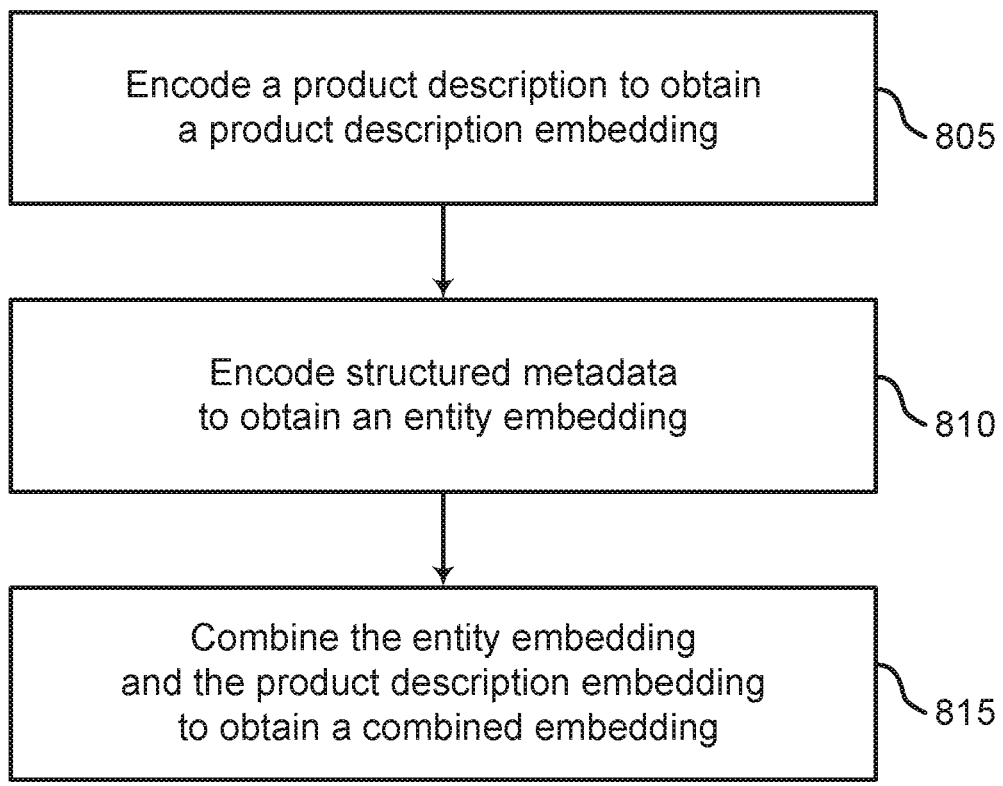
FIG. 8 shows an example of obtaining a combined embedding according to aspects of the present disclosure.

FIG. 8 shows an example of obtaining a combined embedding according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations. Referring to FIG. 8, the system produces a combined embedding based on a product description embedding and an entity embedding.

At operation 805, the system encodes a product description to obtain a product description embedding. In some cases, the operations of this step refer to, or may be performed by, a multi-modal encoder as described with reference to FIGS. 2 and 3.

According to some aspects, the multi-modal encoder receives a product domain dataset including images depicting a plurality of products, product descriptions of the products, where the product descriptions are unstructured text describing the products depicted in the plurality of images, and structured metadata corresponding to the plurality of images. As used herein, each product associated with the dataset is a candidate product. An example of a product domain dataset is Fashion-Gen, which includes 293,008 images of products, unstructured text descriptions of the products, and tagged metadata corresponding to the images and the products. According to some aspects, the multi-modal encoder retrieves the plurality of images and from a database described with reference to FIG. 1. According to some aspects, the multi-modal encoder retrieves the dataset by a web-crawling process.

As used herein, "unstructured" refers to natural language, while "structured" refers to language that is organized according to correlations between two or more fields. For example, a product description of an image in the plurality of images is unorganized natural language, while structured metadata describing the image can be organized as key-value pairs, where each key of the pair is an entity type, and each value is the value of the entity type. An example key-value pair as used herein is "Brand: Gasoline", where the key (e.g., the entity type) is "Brand" and the value is "Gasoline".

In some embodiments, a product description and structured metadata corresponding to an image are included in an image file of the image. In some embodiments, a product description and structured metadata corresponding to an image are associated with the image based on a data schema included in a database described with reference to FIG. 1.

In the neural network context, an embedding refers to a learned low-dimensional representation of discrete data as continuous vectors that can be used to compare one embedding with another (via nearest neighbors calculation), as input into a neural network, and/or visualizations. An embedding space refers to a vector space that includes vector representations of inputs (i.e., embeddings). In a cross-modal retrieval context, a text and an image can be embedded in a same embedding space so that an image can be matched with the text by comparing their embeddings and determining how closely they match. In an example, a text encoder of the multi-modal encoder obtains the product description embedding $E_i^D$ by encoding the product description D, where i indicates a given image i of the plurality of images.

At operation 810, the system encodes structured metadata to obtain an entity embedding. In some cases, the operations of this step refer to, or may be performed by, an entity encoder as described with reference to FIG. 2. According to some aspects, the multi-modal encoder passes the structured metadata of the dataset to the entity encoder, and the entity encoder obtains entity embedding $E_i^A$ by encoding the structured metadata A corresponding to the image i. According to some aspects, the entity encoder identifies structured metadata for a product when it receives the structured metadata from the multi-modal encoder.

At operation 815, the system combines the entity embedding and the product description embedding to obtain a combined embedding. In some cases, the operations of this step refer to, or may be performed by, an entity-aware module as described with reference to FIGS. 2 and 3.

According to some aspects, the entity-aware module allows the retrieval component to capture entity information included in the structured metadata while avoiding a bias towards an understanding of some terms that may be present in a multi-modal encoder that has been pre-trained on a large general domain dataset to learn how to perform a cross-modal retrieval task (e.g., retrieving an image that matches a text input, and vice versa) or intertwined entity representation because of shared (sub)word tokens.

In some embodiments, the multi-modal encoder is pre-trained using a large general-domain dataset to perform cross-modal retrieval. The large size of the general domain dataset is beneficial in the pre-training process, as it provides a baseline number of examples for the multi-modal encoder to learn to perform the cross-modal retrieval task. However, the general domain dataset may bias the multi-modal encoder toward a commonsense understanding of text that may be inappropriate when applied in the product retrieval context. For example, during the pre-training process, the multi-modal encoder may learn to associate images with the text "Gasoline" based on a commonsense understanding of the word "gasoline" (i.e., a fuel). However, in the product retrieval context, "Gasoline" may instead refer to a clothing brand, and the commonsense understanding of the word "Gasoline" gained from the general domain may interfere with the multi-modal encoder's ability to properly retrieve results based on a text input of "Gasoline" intended to return product results. An example of commonsense understanding of text learned from a general domain versus an understanding of text that is useful in the product retrieval domain is illustrated with reference to FIG. 11.

In contrast to the multi-modal encoder, which according to some aspects is pre-trained on a general domain dataset, the entity encoder is not, and the entity-aware module obtains combined embedding $E_i^T$ by combining the entity embedding $E_i^A$ and the product description embedding $E_i^D$:

$$E_i^T = E_i^A + E_i^D \quad (1)$$

According to some aspects, by separately encoding the entity embedding using an entity encoder, rather than the multi-modal encoder, embodiments of the present disclosure encode product-domain-derived entity information into a multi-modal embedding space while avoiding a potential bias towards a general domain-based understanding of $E_i^D$ that may be introduced by a multi-modal encoder.

According to some aspects, the product embedding is based on the combined embedding. For example, in some embodiments, an image encoder of the multi-modal encoder encodes image of the product i to obtain image embedding $E_i^I$. In some embodiments, image embedding $E_i^I$ is in a same embedding space as combined embedding $E_i^T$. In some embodiments, combined embedding $E_i^T$ includes the brand embedding. In some embodiments, the multi-modal encoder combines image embedding $E_i^I$ and the brand embedding to obtain the product embedding. In some embodiments, the multi-modal encoder combines image embedding $E_i^I$ and combined embedding $E_i^T$ to obtain the product embedding.

In an example, multi-modal encoder generates the product embedding by taking the cosine similarity of an image embedding $E_i^I$ of the image i output by an image encoder of the multi-modal encoder and the combined embedding $E_i^T$. In some embodiments, the multi-modal encoder computes an individual product embedding corresponding to each image in the dataset. In some embodiments, the multi-modal encoder stores the individual product embeddings as a set of candidate product embeddings in the database described with reference to FIG. 1, where each candidate product embedding is associated with the corresponding image, unstructured text, and structured metadata according to a data schema.

Figure 9:
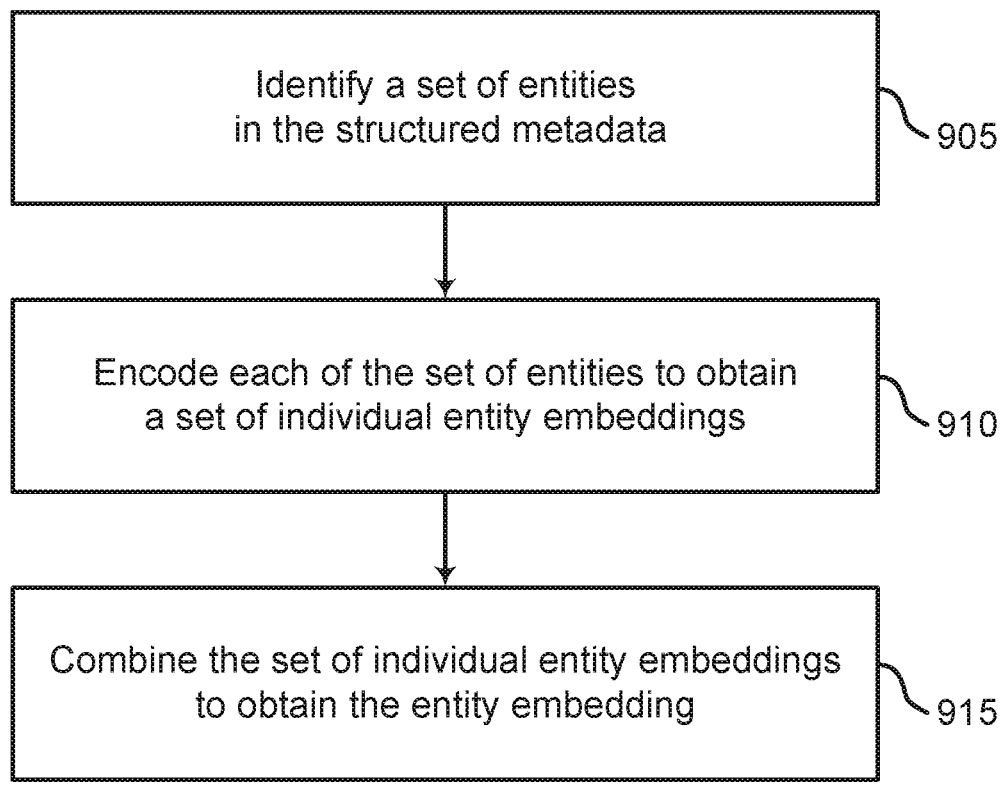
FIG. 9 shows an example of obtaining an entity embedding according to aspects of the present disclosure.

FIG. 9 shows an example of obtaining an entity embedding according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 9, the system obtains an entity embedding by combining a plurality of individual entity embeddings.

At operation 905, the system identifies a set of entities in the structured metadata. In some cases, the operations of this step refer to, or may be performed by, an entity encoder as described with reference to FIG. 2. For example, the entity encoder receives structured metadata from the multi modal encoder as described with reference to FIG. 8. In some embodiments, the structured metadata is organized as key-value pairs, where each key of the pair is an entity type, and each value is the value of the entity type. An example key-value pair as used herein is "Brand: Gasoline", where the key (e.g., the entity type) is "Brand" and the value is "Gasoline". In some embodiments, the entity encoder identifies the set of entities in structured metadata A corresponding an image i by identifying a set of keys (e.g., entity types). According to some aspects, the set of entities includes the brand. For example, the key-value pairs in the set of entities includes the key (e.g. entity type) "Brand".

At operation 910, the system encodes each of the set of entities to obtain a set of individual entity embeddings. In some cases, the operations of this step refer to, or may be performed by, a plurality of entity encoders as described with reference to FIG. 2. For example, each encoder in the plurality of entity encoders encodes a corresponding entity (e.g., a key-value pair) included in the structured metadata to obtain an individual entity embedding. That is, for each entity $A_1$ to $A_k$ (i.e., $A_i^K$) corresponding to an image i, the plurality of entity encoders outputs individual entity embeddings $E_1$ to $E_k$ (i.e., $EE_i^K$). According to some aspects, the set of individual entity embeddings includes the brand embedding (e.g., an embedding of an individual entity that includes a "Brand" key or entity type).

At operation 915, the system combines the set of individual entity embeddings to obtain the entity embedding. In some cases, the operations of this step refer to, or may be performed by, an entity selector as described with reference to FIG. 2.

In an example, the entity selector selects entity embeddings corresponding to relevant entities from the plurality of individual entity embeddings. An entity is considered relevant where the key of the entity contributes towards returning a correct a search result, and is considered irrelevant where the key of the entity contributes towards returning an incorrect search result. In some embodiments, an entity including the "Brand" key (entity type) is relevant, and other entities are irrelevant. In some embodiments, entities including keys other than "Brand" are relevant. An example of an irrelevant entity that may contribute towards an inaccurate search result is an entity that includes the "Category" key (entity type).

In some embodiments, the entity selector implements a gate network $G_k(\cdot)$ including a multi-layer perceptron and a sigmoid function to determine a selection factor $w_k$ within the range of $(0,1)$ to determine a degree of relevance of each individual entity $A_1$ to $A_k$ in a set of individual entities $A_i^K$ associated with the individual entity embeddings $E_1$ to $E_k$ in a set of individual entity embeddings $E_i^K$:

$$w_k = G_k(E_i^K) \quad (2)$$

In some embodiments, $w_k$ assumes a normal distribution of the individual entity embeddings $$\left(\text{e.g., } P(E_i^K) = \frac{1}{K}\right).$$

Accordingly, in some embodiments, the entity selector obtains the entity embedding $E_i^A$ as a summation (e.g., a weighted entity embedding) of the plurality of individual entity embeddings, where the normal distribution of the individual entity embeddings is used to normalize the summation:

$$E_i^A = \sum_k w_k \cdot E_i^K \cdot \frac{1}{K} \qquad (3)$$

In statistical terms, each individual entity can be considered as a confounder z that may influence the retrieval component to return an incorrect result in response to a search term based on a spurious correlation between the entity and the product.

In these terms, equation (3) can be rewritten as:

$$E_i^A = \sum_z \alpha_z \cdot z \cdot P(z) \qquad (4)$$

where $\alpha_z$ is a relevance factor.

Conventional product retrieval techniques may take a naïve approach of concatenating every individual entity in metadata corresponding to an input image to produce an embedding of the metadata, thereby introducing spurious correlations between images and texts that influence the conventional product retrieval techniques to return incorrect results in response to an input query. In contrast, by producing an entity embedding that is a weighted summation of individual entity embeddings, some embodiments of the present disclosure provide an entity embedding that avoids potential spurious correlations between an input text and an image when the entity embedding is used in a comparison between a text embedding and an image embedding.

Training

Figure 10:
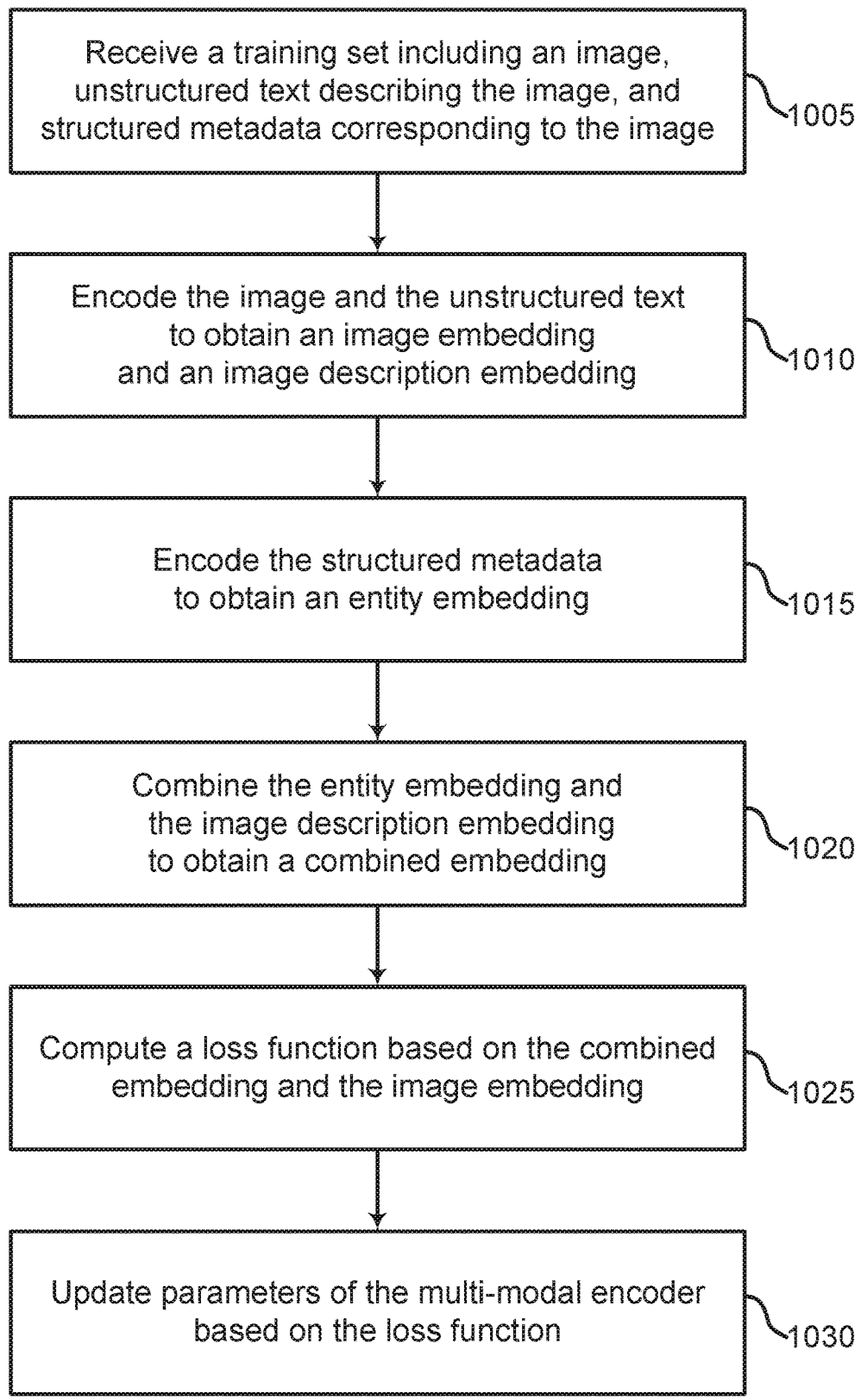
FIG. 10 shows an example of training a machine learning model according to aspects of the present disclosure.
Figure 12:
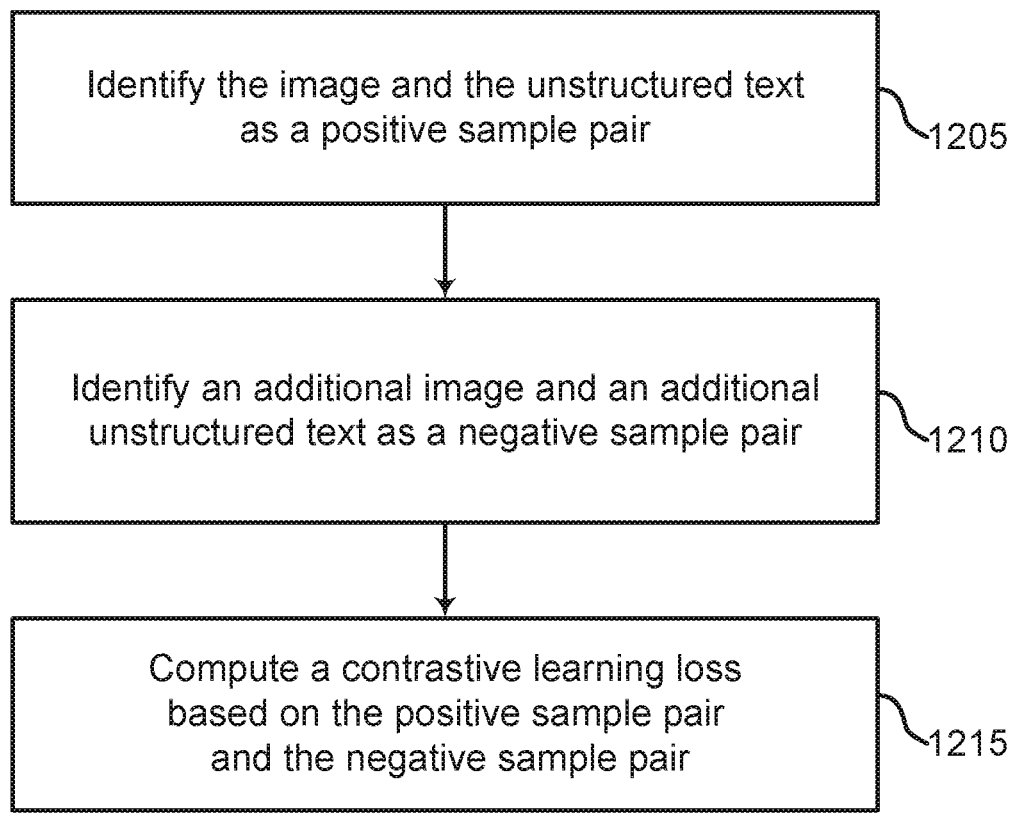
FIG. 12 shows an example of computing a contrastive learning loss according to aspects of the present disclosure.

In FIGS. 10-12, a method for product retrieval is described. One or more aspects of the method include receiving a training set comprising an image, unstructured text describing the image, and structured metadata corresponding to the image; encoding the image and the unstructured text to obtain an image embedding and an image description embedding; encoding the structured metadata to obtain an entity embedding; combining the entity embedding and the image description embedding to obtain a combined embedding; computing a loss based on the combined embedding and the image embedding; and updating parameters of the multi-modal encoder based on the loss.

Some examples of the method, apparatus, non-transitory computer readable medium, and system further include identifying a plurality of entities in the structured metadata. Some examples further include encoding each of the plurality of entities to obtain a plurality of individual entity embeddings. Some examples further include combining the plurality of individual entity embeddings to obtain the entity embedding.

Some examples of the method, apparatus, non-transitory computer readable medium, and system further include providing the plurality of individual entity embeddings to an entity selector, wherein the entity selector comprises a gate network that outputs the entity embedding.

Some examples of the method, apparatus, non-transitory computer readable medium, and system further include identifying the image and the unstructured text as a positive sample pair. Some examples further include identifying an additional image and an additional unstructured text as a negative sample pair, wherein the additional image is not associated with the additional unstructured text. Some examples further include computing a contrastive learning loss based on the positive sample pair and the negative sample pair.

In some aspects, the contrastive learning loss is based on the image embedding and the combined embedding. In some aspects, the contrastive learning loss is based on the image embedding and the image description embedding. In some aspects, the contrastive learning loss is based on the image embedding and the entity embedding.

FIG. 10 shows an example of training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 10, a training component described with reference to FIG. 2 updates parameters of a multi-modal encoder described with reference to FIG. 2 according to a loss computed based on information output by a retrieval component described with reference to FIG. 2.

At operation 1005, the system receives a training set including an image, unstructured text describing the image, and structured metadata corresponding to the image. In some cases, the operations of this step refer to, or may be performed by, a multi-modal encoder as described with reference to FIGS. 2 and 3

According to some aspects, the multi-modal encoder retrieves the training set from a database described with reference to FIG. 1. According to some aspects, the multi-modal encoder retrieves the training set by a web-crawling process. In some embodiments, the unstructured text and the structured metadata correspond to the image as metadata included in the image. In some embodiments, the unstructured text and the structured metadata correspond to the image based on an association in a data schema included in the database. According to some aspects, the training set includes a set of images, unstructured text, and structured metadata that depict and describe products. An example of such a training set is Fashion-Gen, which includes 293,008 images of products, unstructured descriptions of the products, and tagged metadata corresponding to the images and the products.

At operation 1010, the system encodes the image and the unstructured text to obtain an image embedding and an image description embedding. In some cases, the operations of this step refer to, or may be performed by, a multi-modal encoder as described with reference to FIGS. 2 and 3. In some embodiments, an image encoder of the multi-modal encoder obtains the image embedding as described with reference to FIG. 8. In some embodiments, the unstructured text is similar to product description described with reference to FIG. 8, the image description embedding is similar to the product description embedding described with reference to FIG. 8, and a text encoder of the multi-modal encoder obtains an image description based on the unstructured text using a similar process as is used to obtain the product description embedding based on the product description as described with reference to FIG. 8.

At operation 1015, the system encodes the structured metadata to obtain an entity embedding. In some cases, the operations of this step refer to, or may be performed by, an entity encoder as described with reference to FIG. 2. In some embodiments, the entity encoder obtains the entity embedding as described with reference to FIG. 8. In some cases, the operations of this step refer to, or may be performed by, an entity selector as described with reference to FIG. 2. In some embodiments, the entity selector obtains the entity embedding as described with reference to FIG. 9.

At operation 1020, the system combines the entity embedding and the image description embedding to obtain a combined embedding. In some cases, the operations of this step refer to, or may be performed by, an entity-aware module as described with reference to FIGS. 2 and 3. In some embodiments, the entity-aware module obtains the combined embedding as described with reference to FIG. 8.

At operation 1025, the system computes a loss based on the combined embedding and the image embedding. In some cases, the operations of this step refer to, or may be performed by, a training component as described with reference to FIG. 2. In some embodiments, the training component computes the loss as described with reference to FIG. 12.

At operation 1030, the system updates parameters of the multi-modal encoder based on the loss. In some cases, the operations of this step refer to, or may be performed by, a training component as described with reference to FIG. 2. For example, the training component updates the parameters of the multi-modal encoder as described with reference to FIG. 12.

FIG. 11 shows an example of a comparison of the general domain and the product domain according to aspects of the present disclosure. The example shown includes first general domain pair 1100, second general domain pair 1105, first product domain pair 1110, and second product domain pair 1115.

Referring to FIG. 11, first general domain pair 1100 and second general domain pair 1105 illustrate examples of image-text pairs that might be included in a general domain dataset. For example, first general domain pair 1100 includes an image of fuel pumps, a text description "Gas Station", and metadata tags including "Gasoline", "Fuel", "Garage", "Gas", etc. Likewise, second general domain pair 1105 includes an image of a goose, a text description "California Goose Big Bird in Flight Close Beautiful Water Lake", and metadata tags including "Goose", "California", "Wing", "Flying", etc.

In contrast, first product domain pair 1110 and second product domain pair 1115 are examples of image-text pairs that might be included in a product domain dataset. For example, first product domain pair 1110 includes an image of a t-shirt, a text description "Crew Neck T-Shirt", and key-value pairs including "Brand: Gasoline", "Composition [shell]: Cotton", "Fit: Relaxed", etc. Likewise, second product domain pair 1115 includes an image of a coat, a text description "California Goose Men's Expedition Parka Coat", and key-value pairs including "Brand: California Goose", "Composition [shell]: Nylon", "Fit: Relaxed", etc.

Referring to first general domain pair 1100 and first product domain pair 1110, a comparative multi-modal encoder model trained based on a general domain may interpret the term "Gasoline" included in first general domain pair 1100 to mean a type of fuel, and return an image relating to the fuel in response to a query that includes the word "gasoline". However, this interpretation of the term is incorrect in a product-retrieval task, and the comparative multi-modal encoder may not retrieve products relating to the key value pair "Brand: Gasoline" in response to a query including the word "gasoline" in a product-retrieval context. A similar comparison may be made between second general domain pair 1100 and second product domain pair 1115.

According to some aspects, the parameters of the multi-modal encoder may be updated based on an image embedding, a product description embedding, and an entity embedding such that the multi-modal encoder avoids a bias introduced by misleading metadata included in first product domain pair 1110 and second product domain pair 1115 and/or the metadata and image descriptions included in first general domain pair 1100 and second general domain pair 1105 (e.g., confounders described with reference to FIGS. 9 and 12).

FIG. 12 shows an example of computing a contrastive learning loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 12, the system computes a contrastive loss based on a positive sample pair and a negative sample pair. In some embodiments, the contrastive learning loss is the loss described with reference to FIG. 10. Contrastive learning refers to a type of machine learning in which a model is trained using the selection of positive and negative sample pairs. Contrastive learning can be used in either a supervised or unsupervised (e.g., self-supervised) training context. A loss function for a contrastive learning model can encourage a model to generate similar results for positive sample pairs, and dissimilar results for negative sample pairs.

At operation 1205, the system identifies the image and the unstructured text as a positive sample pair. In some cases, the operations of this step refer to, or may be performed by, a training component as described with reference to FIG. 2. For example, in some embodiments, the multi-modal encoder provides the training set described with reference to FIG. 10 to the training component, and the training component selects an image and unstructured text associated with the image as a positive sample pair (e.g., a matching pair). Referring to FIG. 3, an example image is image 335, and an example unstructured text is unstructured text 345. According to some aspects, the training component identifies each possible matching pair in the training set as a positive pair.

At operation 1210, the system identifies an additional image and an additional unstructured text as a negative sample pair, where the additional image is not associated with the additional unstructured text. In some cases, the operations of this step refer to, or may be performed by, a training component as described with reference to FIG. 2. Referring to FIG. 3, an example additional image is image m of N, and an example additional unstructured text is unstructured text n of N, where m does not equal n. Image m and text n therefore form a negative sample pair (e.g., a non-matching pair). According to some aspects, the training component identifies each possible non-matching pair in the training set as a negative pair.

At operation 1215, the system computes a contrastive learning loss based on the positive sample pair and the negative sample pair. In some cases, the operations of this step refer to, or may be performed by, a training component as described with reference to FIG. 2.

A comparative multi-modal encoder model including an image encoder and text encoder may apply contrastive learning to learn visual representations from the training set. An example of such a multi-modal encoder is a CLIP (Contrastive Language-Image Pre-training) model. For example, given a batch of image-text pairs $\{(I_i, T_i)\}_{i=1}^{N}$, where N is the batch size, the image encoder $f_I(\cdot)$ and the text encoder $f_T(\cdot)$ respectively encode an image and a text from an image-text input pair into vectors (embeddings) $E_i^I$ and $E_i^T$ on a multi-modal embedding space $\mathbb{R}^d$:

$$E_i^I = f_I(I_i) \in \mathbb{R}^d \qquad (5)$$

$$E_i^I = f_I(I_i) \in \mathbb{R}^d \qquad (6)$$

where d is the dimension of the embedding. The example multi-modal encoder model may then calculate the cosine similarity $E_i^I \odot E_i^T (i,j \in \{1,2 \ldots, N\})$ of all N×N possible pairs during a pre-training process. To jointly train the image encoder and text encoder, the comparative multi-modal encoder model maximizes the cosine similarity for N matched pairs and minimizes the cosine similarity for all other $N^2-N$ unmatched pairs, thereby optimizing a symmetric cross-entropy loss over the N×N similarity scores matrix.

As the comparative multi-modal encoder model calculates cosine similarities based on a global embedding of images and texts, a correspondence between words and local image features may be learned implicitly. To model a token-level correspondence, the comparative multi-modal encoder model benefits from a sufficiently large dataset during the pre-training process. For example, the CLIP model is pre-trained using dataset including 400 million image-text pairs. Because the comparative multi-modal encoder model is trained on a large general domain dataset, the comparative multi-modal encoder model is biased towards a "commonsense" understanding to the text $T_i$. Typically, a bias towards the general domain is beneficial to a generalization ability of a multi-modal encoder model. However, this bias presents difficulties when the comparative multi-modal encoder model is used for image-text comparison texts in specific domains, such as the product retrieval domain.

From a causal perspective, the text $T_i$ may be referred to as X and the image $I_i$ may be referred to as Y, and erroneous semantics of product-domain entities (e.g., brands) may be referred to as confounders z, which may affect either X or Y, and thus introduce spurious correlations in the comparative multi-modal encoder model, as the comparative multi-modal encoder model only learns from P(Y|X). In an example, in the product domain, when a brand entity with a value of "California Goose" (confounder z) is included in X, the function P (Y|X) tends to retrieve an image including an image related to California, or to a goose, rather than the brand California Goose. By the Bayes Rule, the likelihood of a match between retrieving an Y based on X can be written as:

$$P(Y|X) = \sum_z P(Y, z|X) = P(Y|X, z)P(z|X) \qquad (7)$$

where the confounder z introduces the bias inherent in the general domain training set via P(z|X).

However, according to some aspects, the influence of confounder z may be relieved by intervening with X using the do-calculus:

$$P(Y|do(X)) = \sum_z P(Y|X, z)P(z) \qquad (8)$$

Therefore, in equation (7), X and z are independent, whereas in equation (8), X is dependent upon z.

According to some aspects, contrastive training of the multi-modal encoder may be formed as a classification task. In the causal view of the classification task, P(Y|X, z) can be regarded as a classifier with N categories. Given $j \in \{1,2 \ldots, N\}$ as a label of image Y, P(Y|X, z) in equation (8) can be implemented by the multi-modal encoder as $P(j|X, z) = \text{Softmax}[f_j(X, z)]$, where $f_j(X, z)$ takes the text X and the confounder z and predicts the probability of class j, which is the cosine similarity between a jth image's embedding $E_i^I$ and the embedding of (X, z). According to some aspects, the multi-modal encoder applies the NWGM (Normalized Weighted Geometric Mean) to approximate expensive sampling, and equation (8) can be implemented as:

$$P(Y|do(X)) = \text{Softmax}[E_z(f_j(X, z))] \qquad (9)$$

Furthermore, according to some aspects, the multi-modal encoder implements the function P(Y|do(X)) using an image embedding $E_j^I$ of a jth image i output by the image encoder as described with reference to FIG. 8, the image description embedding $E_i^D$ output by the text encoder as described with reference to FIGS. 8 and 10, and the entity embedding $E_i^A$ output by the entity encoder as described with reference to FIG. 8 or the entity selector as described with reference to FIG. 9:

$$P(Y|do(X)) = \text{Softmax}[E_j^I \odot (E_i^D + E_i^A)] \qquad (10)$$

where $E_i^D + E_i^A$ is the combined embedding $E_i^T$ output by the entity-aware module described with reference to FIG. 8. Accordingly, in contrast to the comparative multi-modal encoder model, according the multi-modal encoder implements the function P(Y|X) using a disentangled $E_i^D$ and $E_i^A$ that is obtained from a text encoder and an entity encoder or an entity selector, respectively, rather than one text embedding obtained from a pre-trained text encoder. By using the disentangled $E_i^D$ and $E_i^A$, the multi-modal encoder may avoid a bias introduced by a commonsense understanding of input text.

According to some aspects, the multi-modal encoder computes P(Y|do(X)) as in equation (10) for the positive sample pair and for the negative sample pair, and provides the outputs of the computation to the training component. In some embodiments, the $E_i^A$ term in the P(Y|do(X)) function for the positive sample pair matches the $E_i^D$ term and the $E_j^I$ term. In an example, referring to FIG. 3, $E_i^A$ corresponds to plurality of entities 355, $E_i^D$ corresponds to unstructured text

345, and $E_j^I$ corresponds to image 335. In some embodiments, the $E_i^A$ term in the P(Y|do(X)) function for the negative sample pair matches the $E_i^D$ term and does not match the $E_j^I$ term.

Then, after receiving the P(Y|do(X)) corresponding to the positive sample pair and the P(Y|do(X)) corresponding to the negative sample pair, the training component calculates a contrastive loss using a contrastive loss function, such that the multi-modal encoder would maximize P(Y|do(X)) for the positive sample pair and would minimize P(Y|do(X)) for the negative sample pair. The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data (e.g., the loss). After computing the loss, the training component updates the parameters of the multi-modal encoder based on the loss, and a new set of predictions are made by the multi-modal encoder during the next iteration. According to some aspects, the multi-modal encoder is thereby updated to avoid a commonsense understanding of input text that may be retained from a general domain pre-training process, and instead use an understanding of input text that is relevant to a product-retrieval task.

In some embodiments, the multi-modal encoder computes P(Y|do(X)) for every positive pair and every negative pair, and the training component computes the contrastive learning loss based on the P(Y|do(X)) for every positive sample pair and every negative sample pair.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for product retrieval, comprising:
receiving a query that includes a text description of a target result;
encoding the query to obtain a text embedding representing the target result;
generating a product embedding for a matching product by encoding metadata for the matching product using a plurality of entity encoders to obtain a plurality of entity embeddings and combining the plurality of entity embeddings to obtain the product embedding, wherein each of the plurality of entity embeddings corresponds to an attribute key of the metadata;
identifying the matching product based on the query by comparing the text embedding to the product embedding of the matching product; and
displaying product information for the matching product in response to the query, wherein the product information includes at least one attribute of the metadata corresponding to the attribute key.

2. The method of claim 1, wherein identifying the matching product comprises:
identifying a plurality of candidate products, wherein each of the plurality of candidate products is associated with a candidate product embedding; and
comparing the text embedding to the candidate product embedding for each of the plurality of candidate products.

3. The method of claim 1, further comprising:
displaying an image of the matching product in response to the query.

4. The method of claim 1, wherein:
the metadata comprises structured metadata including a plurality of key-value pairs.

5. The method of claim 1, further comprising:
encoding a product description of the matching product to obtain a product description embedding;
combining the plurality of entity embeddings and the product description embedding to obtain the product embedding.

6. The method of claim 1, further comprising:
encoding an image of the matching product to obtain an image embedding; and
combining the image embedding with the plurality of entity embeddings to obtain the product embedding.

7. A method for product retrieval, comprising:
obtaining a training set by:
- encoding, using a multi-modal encoder, an image and the unstructured text describing the image to obtain an image embedding and an image description embedding, respectively,
- encoding structured metadata corresponding to the image using a plurality of encoders to obtain a plurality of entity embeddings, wherein each of the plurality of entity embeddings corresponds to an attribute key of the structured metadata, and
- combining the plurality of entity embeddings and the image description embedding to obtain a combined embedding;

computing a loss based on the combined embedding and the image embedding; and training the multi-modal encoder using the training set by updating parameters of the multi-modal encoder based on the loss.

8. The method of claim 7, wherein:
the combined embedding is based on a weighted combination of the plurality of entity embeddings.

9. The method of claim 7, further comprising:
identifying the image and the unstructured text as a positive sample pair;
identifying an additional image and an additional unstructured text as a negative sample pair, wherein the additional image is not associated with the additional unstructured text; and
computing a contrastive learning loss based on the positive sample pair and the negative sample pair, wherein the loss comprises the contrastive learning loss.

10. A system comprising:
a memory component; and
a processing device coupled to the memory component, the processing device configured to perform operations comprising:
- receiving a query that includes a text description of a target result;
- encoding the query to obtain a text embedding representing the target result;
- generating a product embedding for a matching product by encoding metadata for the matching product using a plurality of entity encoders to obtain a plurality of entity embeddings and combining the plurality of entity embeddings to obtain the product embedding, wherein each of the plurality of entity embeddings corresponds to an attribute key of the metadata;
- identifying the matching product based on the query by comparing the text embedding to the product embedding of the matching product; and
- displaying product information for the matching product in response to the query, wherein the product information includes at least one attribute of the metadata corresponding to the attribute key.

11. The system of claim 10, further comprising:
an image encoder of a multi-modal encoder configured to encode an image of the matching product to obtain an image embedding.

12. The system of claim 10, further comprising:
a text encoder of a multi-modal encoder configured to obtain the text embedding.

13. The system of claim 10, wherein:
each of the plurality of entity encoders corresponds to an attribute key of the metadata.

14. The system of claim 10, further comprising:
an entity selector configured to weight the plurality of entity embeddings to obtain a weighted entity embedding, wherein the product embedding is based on the weighted entity embedding.

* * * * *